(No Model.)

G. E. CURTIS.
BICYCLE SADDLE.

No. 512,098. Patented Jan. 2, 1894.

Witnesses:
Jno E Parker
J. Henderson

Inventor:
George E. Curtis,
by his Attorney,
Horace Pettit

THE NATIONAL LITHOGRAPHING COMPANY,
WASHINGTON, D. C.

UNITED STATES PATENT OFFICE.

GEORGE E. CURTIS, OF PHILADELPHIA, PENNSYLVANIA.

BICYCLE-SADDLE.

SPECIFICATION forming part of Letters Patent No. 512,098, dated January 2, 1894.

Application filed May 5, 1893. Serial No. 473,112. (No model.)

*To all whom it may concern:*

Be it known that I, GEORGE E. CURTIS, of the city of Philadelphia and State of Pennsylvania, have invented a certain new and useful Improvement in Bicycle-Saddles, of which the following is a full, clear, and exact description.

My invention has relation to bicycle saddles, and has for its object the construction of a form of saddle supporting spring which, while possessing all the advantages of adjustment and of yielding at the desired points, is of simple and cheap construction and may be readily assembled and secured in position.

Figure 1:
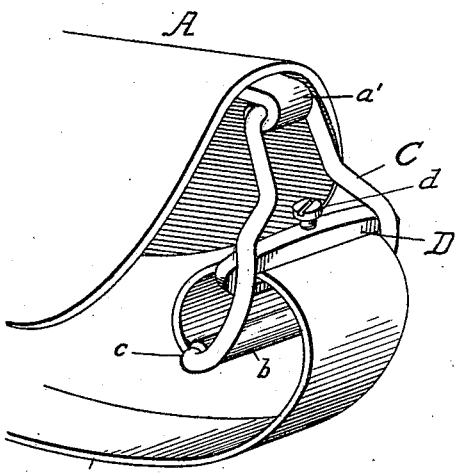
Figure 2:
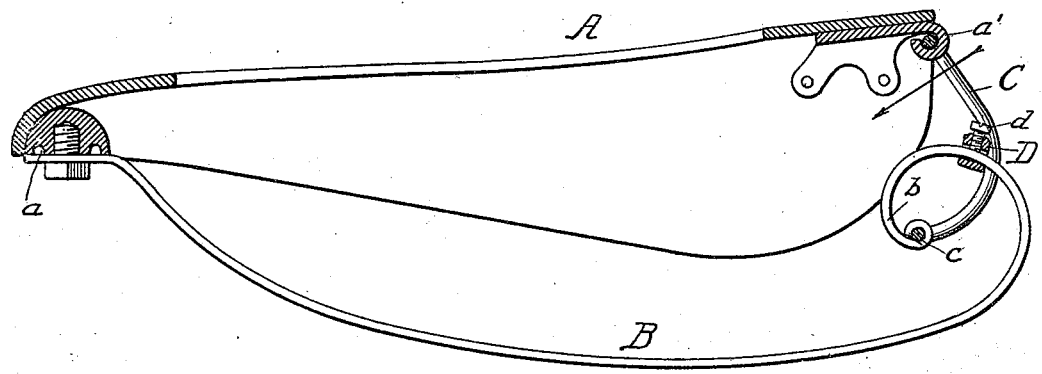
Figure 3:
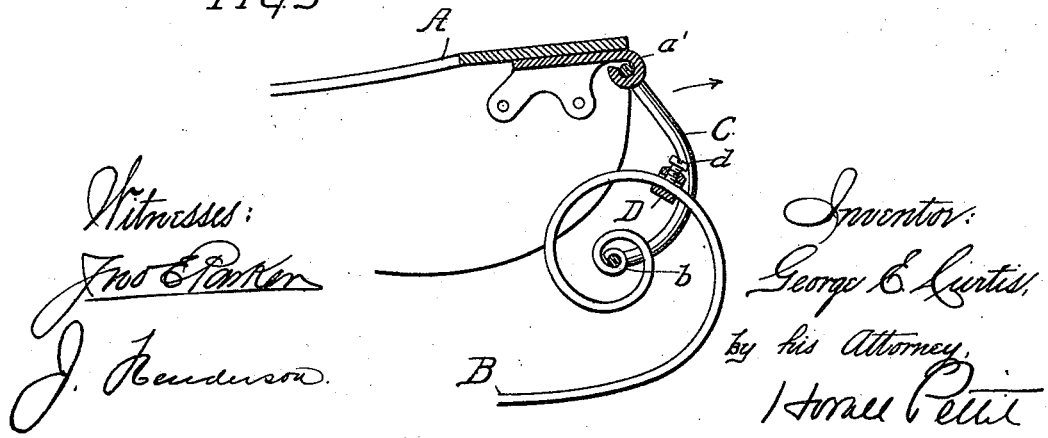

In the accompanying drawings Figure 1 is a perspective view of the forward end of a bicycle saddle, and its supporting spring, illustrating my invention. Fig. 2 is a longitudinal sectional elevation of the same, and Fig. 3 is a similar view of a portion of the same illustrative of a slightly modified construction.

Referring to the drawings, A represents the seat portion, which may be of any suitable contour, and of any suitable material, provided at its rear with a rigid semi-circular shaped bar or cantle, a, to which the rear end of the spring may be attached, and at its front end with an attaching plate or loop, a', for securing the forward end of the spring. To the cantle, a, is secured one end of the supporting spring, B, which extends from thence toward the front, where it is curved in spiral form, with one or more convolutions terminating at the end in a loop, b, into which passes the lower bar, c, of a link or loop, C, the opposite arms of which extend along the opposite sides of the front end of the spring, B, and above the outer convolutions of the spiral, said loop, C, being gradually narrowed to its upper end by which it is attached to the loop or plate, a'. The spring is provided with an encircling loop or yoke, D, preferably held in any position to which it may be adjusted by a screw or screws, d, and when adjusted and held in the position illustrated in the drawings tends to throw the link, C, in the direction of the arrow keeping a sufficient tension upon the body of the seat to keep the latter tightly stretched, and the degree of tension may be altered as much as necessary by loosening the screw, d, or other clamping device and moving the yoke, D, to a new position upon the spring, B.

In use the weight of the rider will cause a movement in the direction of the arrow, Fig. 2, and the loop, C, will be forced into intimate contact with the yoke, D, and a portion of the weight of the rider will be supported by the spiral portion of the spring tending, to a considerable extent, to throw the saddle to the rear.

The main body of the spring, B, is secured in any suitable manner to the seat-post-bracket and, as any of the known constructions of supporting yokes may be employed, I have not considered it necessary to illustrate any form in the drawings.

Having thus described my invention, what I claim, and desire to secure by Letters Patent, is—

1. The combination of the seat, a spring extending from the rear of said seat to, or nearly to, the front of the same, a connecting loop extending from the forward end of the spring to the forward end of the seat and a loop or yoke secured to the spring and against which the connecting loop is adapted to bear, substantially as specified.

2. The combination of the seat, a supporting spring therefor having its forward end partially curved, connecting loop, extending from such forward curved end to the forward end of the seat and an adjustable yoke or arm provided upon said spring and against which the connecting loop is adapted to bear, substantially as specified.

3. The combination of the seat, the supporting spring having its forward end partly curved in a spiral line, a connecting loop extending from the end of the spring to the forward end of the seat, and an adjustable loop or yoke provided upon such spring and against which the connecting loop is adapted to bear, substantially as specified.

4. The combination of a seat, A, a spring, B, the loop, C, extending from the forward end of the spring to the forward end of the seat and the adjustable loop or yoke, D, having a securing device, as d, substantially as specified.

5. In a bicycle saddle the combination of the seat, A, plate spring, B, curved at its forward end terminating in a loop, $b$, a connecting link, C, having its lower bar, $c$, pivoted through the loop, $b$, and secured at its upper end to the seat, A, through the medium of the plate, $a'$, an adjustable yoke, D, provided upon the spring, B, against which yoke the arms of the link, C, are adapted to bear and means for effecting the adjustment, substantially as described.

In witness whereof I have hereunto set my hand this 2d day of May, A. D. 1893.

GEORGE E. CURTIS.

Witnesses:
HORACE PETTIT,
CHAS. W. DAILEY.